US011789839B2

(12) United States Patent
Chew

(10) Patent No.: US 11,789,839 B2
(45) Date of Patent: Oct. 17, 2023

(54) REAL TIME TRIGGER RATE MONITORING IN A MEMORY SUB-SYSTEM

(71) Applicant: Micron Technology, Inc., Boise, ID (US)

(72) Inventor: Francis Chew, Boulder, CO (US)

(73) Assignee: Micron Technology, Inc., Boise, ID (US)

( * ) Notice: Subject to any disclaimer, the term of this patent is extended or adjusted under 35 U.S.C. 154(b) by 265 days.

(21) Appl. No.: 17/214,615

(22) Filed: Mar. 26, 2021

(65) Prior Publication Data

US 2021/0216425 A1 Jul. 15, 2021

Related U.S. Application Data

(63) Continuation of application No. 16/154,842, filed on Oct. 9, 2018, now Pat. No. 10,983,890.

(51) Int. Cl.
G06F 11/00 (2006.01)
G06F 11/30 (2006.01)
G06F 11/10 (2006.01)
G06F 11/34 (2006.01)
G06F 11/07 (2006.01)

(52) U.S. Cl.
CPC ...... G06F 11/3037 (2013.01); G06F 11/0751 (2013.01); G06F 11/0793 (2013.01); G06F 11/1068 (2013.01); G06F 11/3058 (2013.01); G06F 11/3409 (2013.01); G06F 11/3466 (2013.01); G06F 11/3476 (2013.01)

(58) Field of Classification Search
CPC ............. G06F 11/0793; G06F 11/1012; G06F 11/076; G06F 11/073; G06F 11/1068
See application file for complete search history.

(56) References Cited

U.S. PATENT DOCUMENTS

| | | |
|---|---|---|
| 9,092,350 B1 | 7/2015 | Jeon et al. |
| 9,397,703 B2 | 7/2016 | Ghaly et al. |
| 9,507,675 B2 | 11/2016 | Chun et al. |
| 9,619,324 B2 | 4/2017 | Kwok et al. |
| 9,910,606 B2 | 3/2018 | Khoueir et al. |
| 10,073,734 B2 | 9/2018 | Haratsch et al. |
| 10,552,259 B2 | 2/2020 | Jacobvitz et al. |
| 11,188,416 B2 | 11/2021 | Cadloni et al. |
| 2007/0088974 A1 | 4/2007 | Chandwani et al. |

(Continued)

Primary Examiner — Charles Ehne
(74) Attorney, Agent, or Firm — Perkins Coie LLP

(57) ABSTRACT

The rate at which reads on a target memory portion initiate error recovery procedures can be monitored in real-time. Trigger rates can be used to perform analysis of a memory sub-system or to implement improvements in the memory sub-system. Trigger rate monitoring can include accessing a count of error recovery initializations for a target memory portion, wherein the count of error recovery initializations corresponds to a number of times a first stage of a multi-stage error recovery process was performed. Trigger rate monitoring can further include accessing a count of read operations corresponding to the target memory portion. The count of error recovery initializations and the count of read operations can be used to compute a trigger rate. The trigger rate, or multiple trigger rates from various times or from various target memory portions, can be used to compute a metric for the memory portion(s).

17 Claims, 4 Drawing Sheets

(56) References Cited

U.S. PATENT DOCUMENTS

| | | |
|---|---|---|
| 2015/0278015 A1 | 10/2015 | Haratsch et al. |
| 2015/0378858 A1* | 12/2015 | Ishizaka .............. G06F 11/2094 714/6.22 |
| 2016/0147582 A1* | 5/2016 | Karakulak ............ G06F 11/079 714/37 |
| 2017/0277448 A1* | 9/2017 | Khoueir ................ G06F 3/0616 |
| 2018/0189149 A1* | 7/2018 | Alavi ................... G06F 11/0793 |
| 2018/0246794 A1 | 8/2018 | Baty et al. |
| 2019/0107973 A1 | 4/2019 | Chen |
| 2019/0286516 A1 | 9/2019 | Jacobvitz et al. |
| 2020/0089569 A1 | 3/2020 | Cadloni et al. |
| 2020/0110685 A1 | 4/2020 | Chew |

\* cited by examiner

REAL TIME TRIGGER RATE MONITORING IN A MEMORY SUB-SYSTEM

CROSS-REFERENCE TO RELATED APPLICATIONS

This application is a continuation of U.S. patent application Ser. No. 16/154,842, filed Oct. 9, 2018; which is incorporated herein by reference in its entirety.

TECHNICAL FIELD

The present disclosure generally relates to a memory sub-system, and more specifically, relates to monitoring, in real time, a rate of error recovery initializations in relation to a rate of read operations in the memory sub-system.

BACKGROUND

A memory sub-system can be a storage system, such as a solid-state drive (SSD), and can include one or more memory components that store data. The memory components can be, for example, non-volatile memory components and/or volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
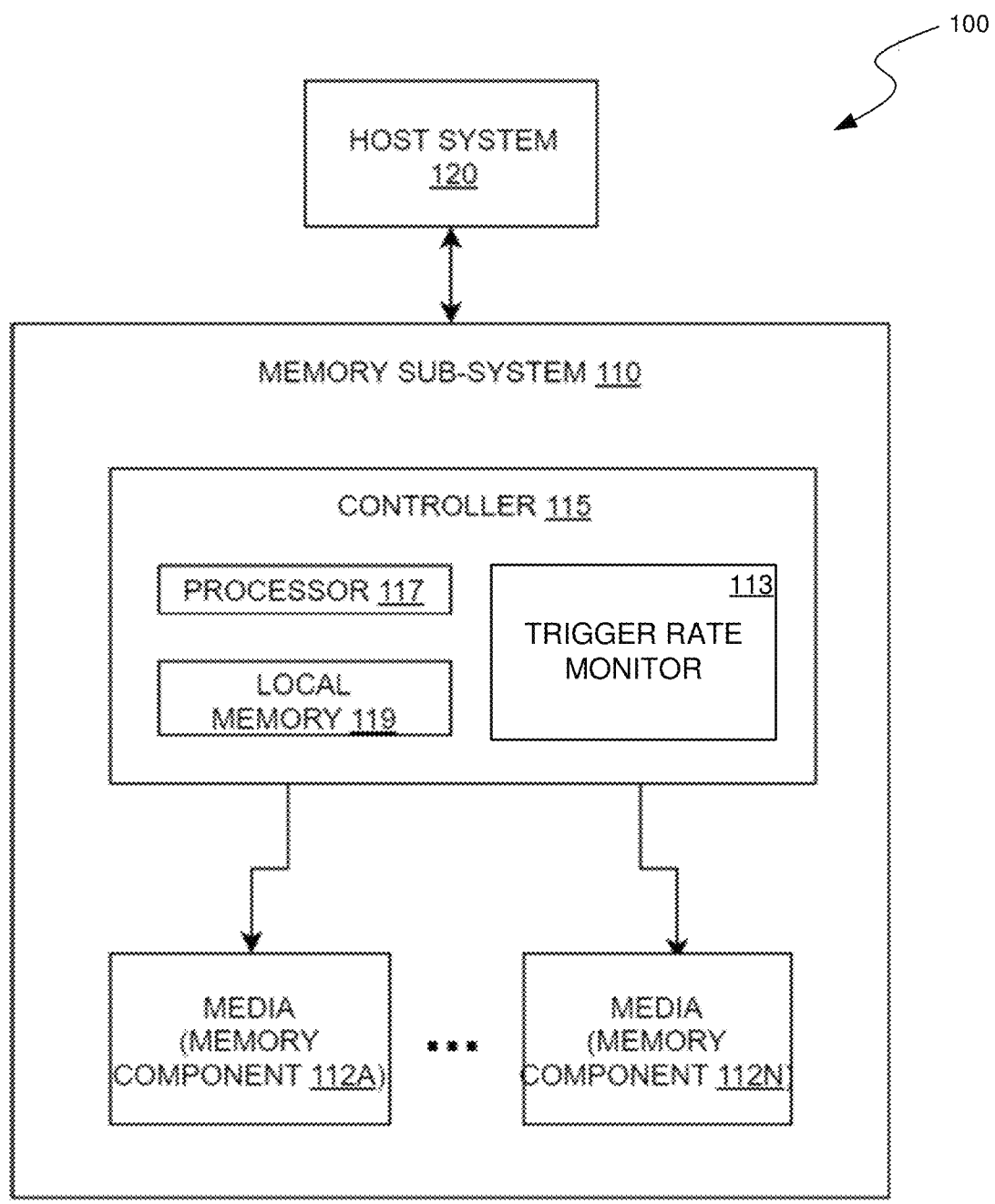
FIG. 1 illustrates an example computing environment that includes a memory sub-system in accordance with some embodiments of the present disclosure.

Aspects of the present disclosure are directed to real time monitoring of trigger rates in a memory sub-system. Additional aspects of the present disclosure are directed to using trigger rates to perform analysis of a memory sub-system or to implement improvements in the memory sub-system. A memory sub-system is also hereinafter referred to as a "memory device." An example of a memory sub-system is a storage system, such as a solid-state drive (SSD). In some embodiments, the memory sub-system is a hybrid memory/storage sub-system. In various implementations, a memory sub-system can include non-volatile memory devices, such as, for example, negative-and (NAND). In general, a host system can utilize a memory sub-system that includes one or more memory components. The host system can provide data to be stored at the memory sub-system and can request data to be retrieved from the memory sub-system. A "trigger rate" is a rate at which a portion of a memory system initiates (e.g. triggers) error recovery procedures.

Existing approaches to obtaining trigger rate data for a memory sub-system involve executing a test suite against the memory sub-system that performs test read operations and monitors for error recovery initiations. However, trigger rate data obtained in this fashion cannot be generated at small granularities, such as at the die level, and is not been available on a real-time basis. In view of these limitations, existing approaches are unable to use this minimal trigger rate data to analyze portions of a memory device and or to effectively adjust aspects of the memory device.

Aspects of the present disclosure address the above and other deficiencies by A) implementing real-time trigger rate monitoring and B) using the monitored trigger rate data to generate new metrics for analyzing a memory sub-system and for adjusting the memory sub-system based on the monitored trigger rate data. A memory sub-system can implement trigger rate monitoring by accessing a count of error recovery procedure initializations tracked for a memory portion and accessing a count of read events for that memory portion. The memory sub-system can be configured to track these error recovery procedures and read operations. In some implementations, the tracking can be for memory portions at any of various granularities, such as at a page level, block level, plane level, die level, across multiple die, in a whole memory device, or in multiple memory devices. In some implementations, the error recovery and read operation tracking can include time meta-data and the accessing can be for a given time window. The memory sub-system can use the count of error recovery initializations and the count of read events to compute a trigger rage for the memory portion, e.g. by dividing the count of error recovery initializations by the count of read events. In some implementations, trigger rates can be computed on-demand or periodically, e.g. when a timer reaches a threshold. Generated trigger rates can be saved to a log. As used herein, a "log" can be any storage system that stores one or more trigger rates. In some implementations, trigger rates stored in a log can be stored with various meta data such as a timestamp, die temperature, or other tag relating to the generated trigger rate or a state of the memory portion the trigger rate is for.

The memory portion can use the log of one or more trigger rates to compute a metric for the memory portion. This metric can be used to perform various analyses for the memory portion or to adjust characteristics of the memory device. In some implementations, the system can determine trends in error triggering, e.g. based on patterns, a maximum, minimum, or slope of points in the trigger rate log. In some implementations, the system can correlate error triggering trends to characteristics of the memory portion, such as die temperature or life stage of the memory device. For example, the processing logic can split the multiple trigger rates from the log into groups based on timestamps or total read counts leading up to each trigger rate. Each group can correspond to a stage in the life cycle of a memory device. The processing logic can then identify a trend for one or more of the groups, thus defining expected performances for memory portions at various points in their life cycles. In some implementations, the system can use the trigger rate to perform failure analysis by determining a characteristic of trigger rates leading up to a failure event or comparing such trigger rates with earlier trigger rates from the log. In some implementations, the system can identify poor performing memory portions that are causing bottlenecks and set them to be disabled or less frequently used. In some implementations, the system can set a background scan frequency based on one or more trigger rates or trigger rate trends. In some implementations, the system can adjust other configurations of for the memory device or memory portion based on the trigger rate metrics, such as clock frequency, power levels, etc.

FIG. 1 illustrates an example computing environment 100 that includes a memory sub-system 110 in accordance with some embodiments of the present disclosure. The memory sub-system 110 can include media, such as memory components 112A to 112N. The memory components 112A to 112N can be volatile memory components, non-volatile memory components, or a combination of such. In some embodiments, the memory sub-system is a storage system. An example of a storage system is a SSD. In some embodiments, the memory sub-system 110 is a hybrid memory/storage sub-system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative-and (NAND) type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory sub-system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 may not include a controller 115, and may instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 112A to 112N.

The memory sub-system 110 includes a trigger rate monitor 113 that can be used to generate, in real-time, trigger rates for a target memory portion and to use trigger rates to make determinations about a memory device and to adjust characteristics of a memory device. In some embodiments, the controller 115 includes at least a portion of the trigger rate monitor 113. For example, the controller 115 can include a processor 117 (processing device) configured to execute instructions stored in local memory 119 for performing the operations described herein. In some embodiments, the trigger rate monitor 113 is part of the host system 110, an application, or an operating system.

The trigger rate monitor 113 can access counts of error recovery flow initializations and counts of read operations for portions of the memory components 112A to 112N of the memory sub-system 110. The trigger rate monitor 113 can determine trigger rates for each of the portions of the memory components 112A to 112N based on one or more operations that use the counts of error recovery flow initializations and counts of read operations, e.g. by dividing an error recovery flow initialization count by a read operation count. The trigger rate monitor 113 can perform these data accesses and trigger rate computations periodically or upon a user request such that the trigger rate is available in real time. The trigger rate monitor 113 can store a log including the trigger rates. The trigger rate monitor 113 can use the computed trigger rate or trigger rate log in various ways such as: measuring quality of a memory device, determining trigger rate trends at different stages of a memory device's life cycle, setting parameters of a memory device, identifying portions of a memory device that are bottlenecks, or performing analyses in response to failure conditions. Further details with regards to the operations of the trigger rate monitor 113 are described below.

Figure 2:
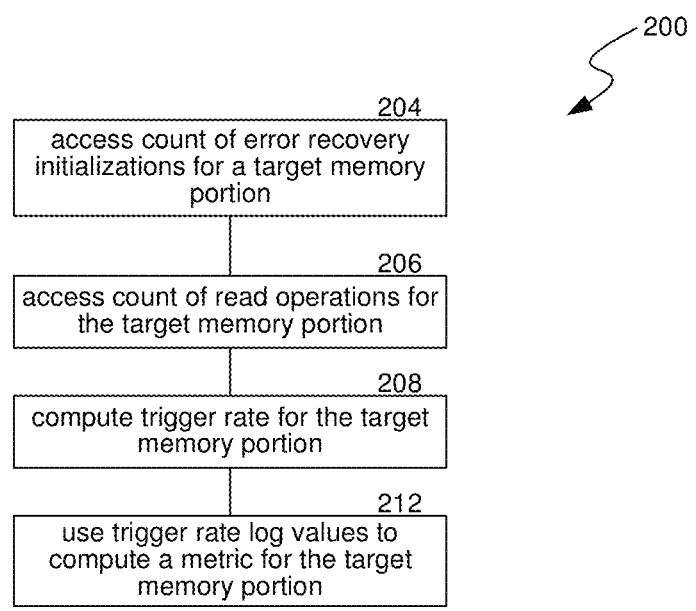
FIG. 2 is a flow diagram of generating a trigger rate log and using the trigger rate log to analyze or improve a memory sub-system in accordance with some embodiments of the present disclosure.

FIG. 2 is a flow diagram of an example method 200 for generating a trigger rate log and using the trigger rate log to improve memory sub-systems in accordance with some implementations of the present technology. The processing logic can include hardware (e.g., processing device, circuitry, dedicated logic, programmable logic, microcode, hardware of a device, integrated circuit, etc.), software (e.g., instructions run or executed on a processing device), or a combination thereof can perform method 200. In some embodiments, the trigger rate monitor 113 of FIG. 1 can perform the method 200. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

In some implementations, a timer reaching a threshold (e.g., counting down to 0 from a predetermined value, or counting up to a predetermined value) can initiate the processing logic for method 200. Repeated uses of the timer can cause the processing logic to generate trigger rate values at successive intervals. When these trigger rate values are stored in a log, they can be used to determine metrics or trends for a memory portion. In some implementations, a request for the current trigger rate can initiate the processing logic for method 200. For example, the request can be from a user using a vendor specific (VS) command. This provides a trigger rate that reflects the most recent operations performed by a memory portion. In various implementations, the processing logic can generate trigger rates for different granularities of target memory portions, such as at a page level, block level, plane level, die level, across sections of multiple die, in a whole memory device, or in multiple memory devices.

At block 204, the processing logic can access a count of error recovery initializations performed for a target memory portion. In some implementations, this count can be read from an error recovery list table. In some implementations, this can be a count of the number of times that a first stage, of a multi-stage error recovery process, was performed. In some various implementations, the count of error recovery initializations can be for the life of the memory portion, since the memory portion was powered on, or for another specified time window. For example, error recovery initializations can be associated with timestamps and a request for a trigger rate for a particular die can specify a time window. In responding to this request, the processing logic can access an error recovery list table that stores records, with timestamps, of error procedures for the particular die and can count the initializations with timestamps within the time window.

At block 206, the processing logic can access a count of read operations for the target memory portion. In some implementations, this count can be obtained from a data store established to track read operations at the level of granularity corresponding to memory portions used by the processing logic. For example, where target memory portions are die, a data store can track read operations or a count of read operations for each die of a memory device. In some implementations, the tracked read operations can be read operations of a certain type, such as code word reads. For example, a single read may retrieve two code words, but this can be counted as two in the count of read operations. In some implementations, the data store can store a total count of read operations for memory portions. This implementation only uses a single integer to track read operations, reducing the amount of storage space required. In some implementations, individual read operations can be tracked with timestamps. While taking additional storage space, this implementation maximizes the detail of data that can be retrieved, allowing trigger rates to be determined for any specific time interval. In some implementations, read operations can be tracked for specified intervals of time. For example, a count of read operations can be saved for each fifteen second interval. This hybrid approach limits the amount of storage space required while allowing for trigger rate requests to specify time windows according to the time interval size.

At block 208, the processing logic can compute a trigger rate for the target memory portion based on the count of error recovery initializations from block 204 and the count of read operations from block 206. In some implementations, the trigger rate can be computed by dividing the count of error recovery initializations from block 204 by the count of read operations from block 206. In some implementations, the processing logic can save the trigger rate from block 208 to a log. In some implementations, instead of saving the trigger rate to a log, the processing logic can return the computed trigger rate, e.g. as a response to a request for a current trigger rate. In some implementations, the trigger rate can be saved or returned with meta-data such as: a timestamp, a temperature of the target memory portion, or other characteristics of the memory portion or memory device that may be relevant to analyzing trends in trigger rates or selecting how best to respond to trigger rates or trigger rate trends. In some implementations, the log can also store values from previous trigger rate determination for the target memory portion or for other target memory portions of the memory device. In some implementations, one or more trigger rates from the log can be retrieved in response to a VS command.

At block 212, the processing logic can use trigger rate log values to compute a metric for the target memory portion or for the device including the target memory portion. The processing logic can use this metric to perform various analyses for the memory portion or to adjust characteristics of the memory device containing the memory portion. In some implementations, the system can determine a trend from the log, such a section of trigger rate data points that form a slope, a section of data points that form a peak or the point that is a maximum, or a section of data points that form a valley or the point that is a minimum. In some implementations, such determinations can be correlated to a cause, such as an amount of time the memory device has been active or number of read events that the memory device has performed. Such correlations can indicate expected error rates at points in the life cycle of the memory device. In some implementations, these determinations can be correlated to meta-data associated with the points used in the determination to identify a cause. Such correlations can indicate how memory device or memory portion characteristics affect error rates. For example, die temperature meta-data can be used to determine how die temperatures affect error rates.

In some implementations, the processing logic use the trigger rate log to perform failure analysis by determining a characteristic of trigger rates leading up to a failure event or comparing such trigger rates with earlier trigger rates from the log. In some implementations, the processing logic can identify poor performing memory portions (e.g. memory portions with high trigger rates) that are causing bottlenecks and set them to be disabled or less frequently used. For example, the processing logic can identify a bottleneck by comparing the metric to a threshold, such as a threshold specifying minimum performance requirements or defining a lower preforming percentage of memory portions, e.g. identify bottlenecks as the 5% of die with the worst trigger rates. In some implementations, the processing logic can set a background scan frequency based on one or more trigger rates or trigger rate trends. For example, a function created using statistical data that maps trigger rates to background scan frequencies to optimize performance can be applied to the metric. In some implementations, the processing logic can adjust other configurations of for the memory device or memory portion, such as clock frequency, power levels, etc., based on the trigger rate metric.

Figure 3:
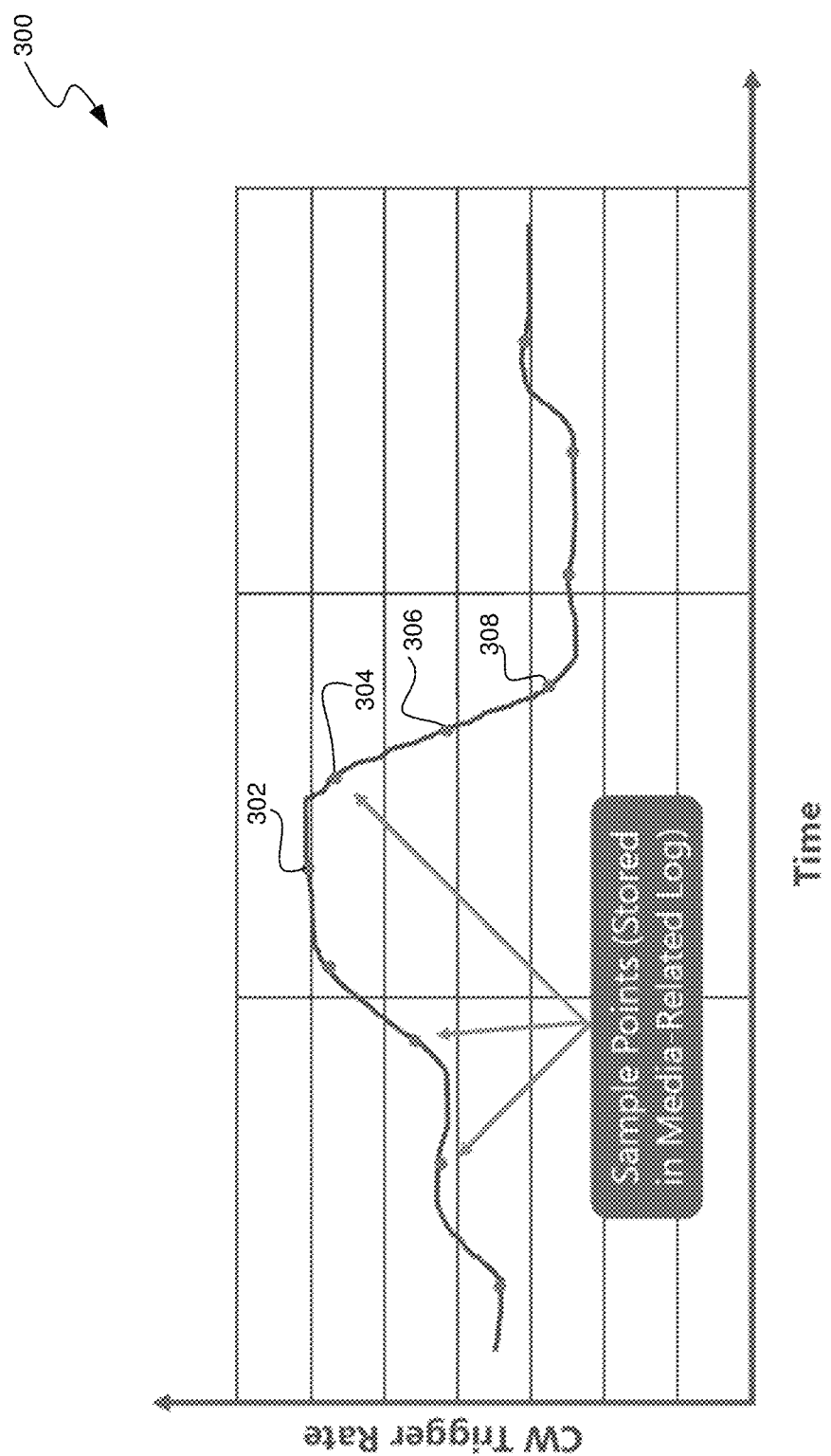
FIG. 3 is a conceptual diagram of example graphed data points from a trigger rate log in accordance with some embodiments of the present disclosure.

FIG. 3 is a graph 300 of example data points from a trigger rate log in accordance with some embodiments of the present disclosure, for a target memory portion that is a die. In graph 300, the trigger rates are logged with timestamps and are graphed with time on the x-axis. In graph 300, trigger rate 302 can be identified as a maximum and a slope of a line fit to trigger rates 304-308 can be identified as metrics for the target die. These metrics can be correlated with temperature data corresponding to trigger rates 302-308 to determine how significant a temperature change is needed in the target die to transition from an unacceptably high trigger rate to a trigger rate that does not cause the die to fall below performance requirements.

Figure 4:
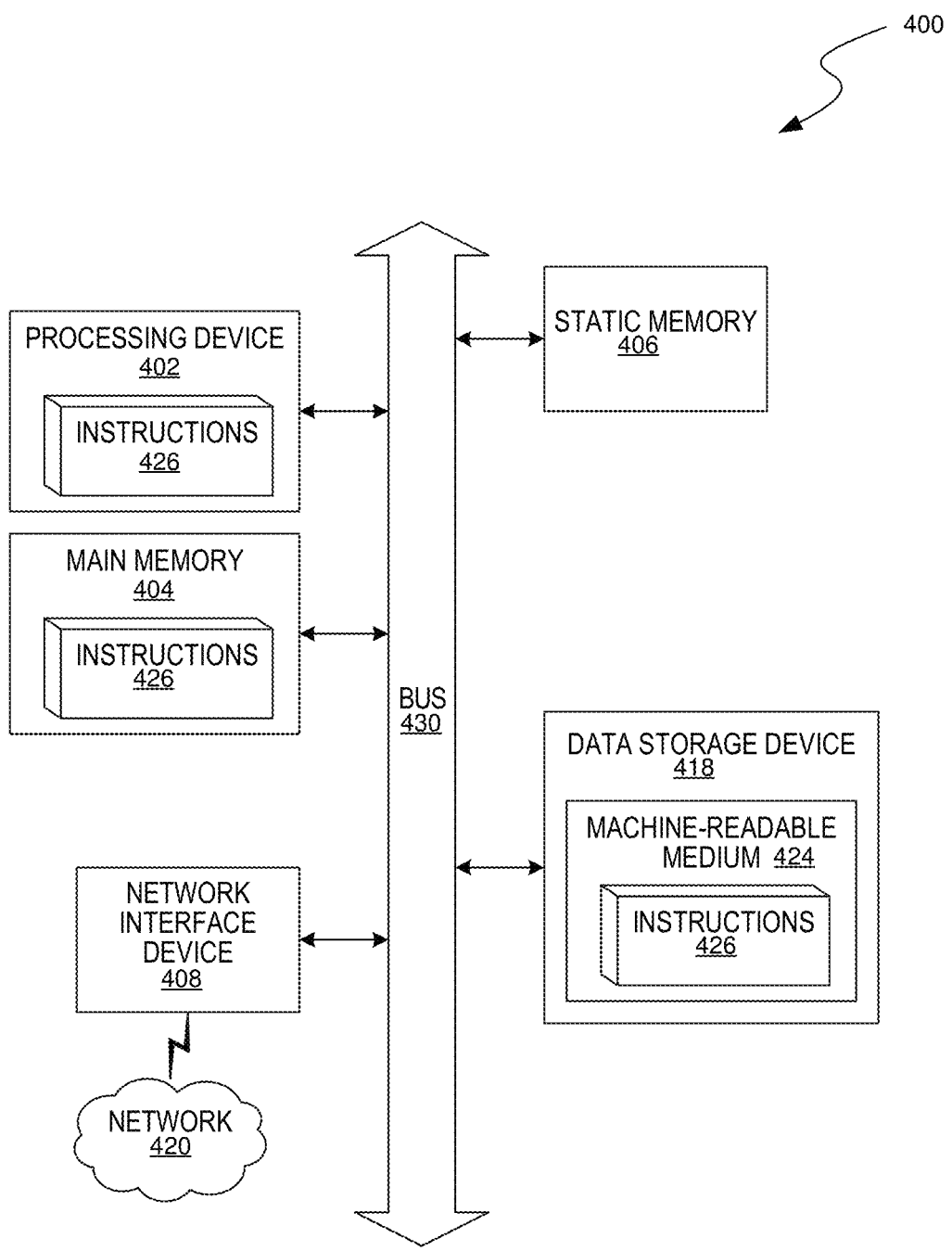
FIG. 4 is a block diagram of an example computer system in which embodiments of the present disclosure may operate.

FIG. 4 illustrates an example machine of a computer system 400 within which a set of instructions, for causing the machine to perform any one or more of the methodologies discussed herein, can be executed. In some embodiments, the computer system 400 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the trigger rate monitor 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage system 418, which communicate with each other via a bus 430.

Processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. The computer system 400 can further include a network interface device 408 to communicate over the network 420.

The data storage system 418 can include a machine-readable storage medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable storage medium 424, data storage system 418, and/or main memory 404 can correspond to the memory sub-system 110 of FIG. 1.

In one embodiment, the instructions 426 include instructions to implement functionality for monitoring and acting on trigger rate data (e.g., the trigger rate monitor 113 of FIG. 1). While the machine-readable storage medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

Those skilled in the art will appreciate that the components and blocks illustrated in FIGS. 1-4 described above, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

I claim:

1. A method comprising:
accessing a count of error recovery initializations for a target memory portion, wherein the count of error recovery initializations corresponds to a number of times a first stage of a multi-stage error recovery process was performed;
accessing a count of read operations corresponding to the target memory portion;
computing a trigger rate for the target memory portion based at least in part on the count of error recovery initializations and the count of read operations and
adjusting, in response to determining that the trigger rate exceeds a predetermined threshold, the target memory portion,
wherein determining that the trigger rate exceeds the predetermined threshold comprises computing a trend based on the computed trigger rate for the target memory portion and on one or more previously-computed trigger rates for the target memory portion stored in a trigger rate log, and determining that the trend exceeds a predetermined trend threshold.

2. The method of claim 1, wherein the method is initiated in response to a start condition for trigger rate sampling comprising a timer reaching a timer threshold.

3. The method of claim 1 further comprising setting a frequency of a background scan for the memory portion based on the computed trigger rate.

4. The method of claim 1, wherein the target memory portion is a die.

5. The method of claim 4, wherein accessing the count of read operations comprises accessing a counter corresponding to a number of code word reads on a per-die basis.

6. The method of claim 1, wherein computing the trigger rate comprises dividing the count of error recovery initializations by the count of read operations.

7. The method of claim 1, wherein the trigger rate is saved to a trigger rate log in association with meta-data specifying a timestamp or a temperature of the target memory portion.

8. The method of claim 1, further comprising computing a metric for the target memory portion by determining one or more of a maximum trigger rate, a minimum trigger rate, or a slope of a function fit to multiple trigger rates from among a group comprising both the computed trigger rate and one or more previously-computed trigger rates.

9. A non-transitory computer-readable storage medium comprising instructions that, when executed by one or more processing devices, cause the one or more processing devices to:
identify a start condition for trigger rate sampling;
access a count of error recovery initializations for a target memory portion;
access a count of read operations corresponding to the target memory portion;
compute a trigger rate for the target memory portion based at least in part on the count of error recovery initializations and the count of read operations; and
adjust, in response to determining that the trigger rate exceeds a predetermined threshold, the target memory portion,
wherein determining that the trigger rate exceeds the predetermined threshold comprises computing a trend based on the computed trigger rate for the target memory portion and on one or more previously-computed trigger rates for the target memory portion stored in a trigger rate log, and determining that the trend exceeds a predetermined trend threshold.

10. The computer-readable storage medium of claim 9, wherein the start condition for trigger rate sampling is receiving a command from a user.

11. The computer-readable storage medium of claim 9, wherein the count of error recovery initializations corresponds to a number of times a first stage of a multi-stage error recovery process was performed.

12. The computer-readable storage medium of claim 9, wherein the operations further comprise:
determining that the target memory portion failed and in response:
accessing multiple trigger rates stored in a trigger rate log; and
computing a metric that compares trigger rates earlier in the trigger rate log to those leading up to the identified failure.

13. The computer-readable storage medium of claim 12, wherein the operations further comprise setting a frequency of a background scan for the target memory portion based on the computed metric.

14. A system comprising:
a memory component; and
a processing device, operatively coupled with the memory component, to:
access a count of error recovery initializations for a target memory portion of the memory device;
access a count of read operations corresponding to the target memory portion;
compute a trigger rate for the target memory portion based at least in part on the count of error recovery initializations and the count of read operations; and
adjust, in response to determining that the trigger rate exceeds a predetermined threshold, the target memory portion,
wherein determining that the trigger rate exceeds the predetermined threshold comprises computing a trend based on the computed trigger rate for the target memory portion and on one or more previously-computed trigger rates for the target memory portion stored in a trigger rate log, and determining that the trend exceeds a predetermined trend threshold.

15. The system of claim 14, wherein the count of read operations is a count of code word read operations.

16. The system of claim 14,
wherein accessing the count of error recovery initializations comprises accessing a count of error recovery initializations within a specified timeframe; and
wherein accessing the count of read operations comprises accessing a count of code word reads within the specified timeframe.

17. The system of claim 14, wherein the count of error recovery initializations corresponds to a number of times a first stage of a multi-stage error recovery process was performed.

\* \* \* \* \*